United States Patent [19]

Dowe

[11] Patent Number: 5,333,025
[45] Date of Patent: Jul. 26, 1994

[54] ROTATING MAGNET FOCAL PLANE SHUTTER USABLE IN A CAMERA AND HAVING AN IMPROVED DEVICE FOR HOLDING THE SHUTTER IN A CLOSED POSITION

[75] Inventor: David R. Dowe, Holley, N.Y.

[73] Assignee: Eastman Kodak Company, Rochester, N.Y.

[21] Appl. No.: 652,843

[22] Filed: Feb. 6, 1991

[51] Int. Cl.⁵ .............................................. G03B 9/08
[52] U.S. Cl. ................................................. 354/234.1
[58] Field of Search ............... 354/234.1, 238.1, 258.1, 354/242, 243, 246, 248, 249, 255

[56] References Cited

U.S. PATENT DOCUMENTS

| | | | |
|---|---|---|---|
| 3,577,901 | 5/1971 | Gray | 354/243 |
| 4,024,555 | 5/1977 | Inou | 354/249 |
| 4,338,013 | 7/1982 | Shimada | 354/234.1 |
| 4,339,190 | 7/1982 | Sugiura | 354/234.1 |

FOREIGN PATENT DOCUMENTS 2101755A 1/1983 United Kingdom .

*Primary Examiner*—Michael L. Gellner
*Assistant Examiner*—J. K. Han
*Attorney, Agent, or Firm*—David A. Howley

[57] ABSTRACT

A shutter for a camera having a film exposure opening comprising a shutter curtain movably mounted in the camera for opening and closing the exposure opening, an electromagnetic driver operatively coupled to the shutter curtain for moving the curtain between open and closed positions when the driver is energized to cause movement in one direction, and a first physical stop associated with the electromagnetic driver for physically holding the driver against further movement in the one direction when the curtain reaches one of the open or closed positions. When the electromagnetic driver is energized to cause movement in an opposite direction, a second physical stop associated with the driver and spaced from the first stop physically holds the driver against further movement in the opposite direction when the curtain reaches the other of the open or closed positions. In a focal plane shutter having first and second shutter curtains movably mounted in the camera for opening and closing the film exposure opening, there is provided first and second of the aforesaid electromagnetic drivers operatively coupled to the first and second curtains, respectively, for moving the curtains between open and closed positions when the respective drivers are energized, and each of the electromagnetic drivers is provided with the aforesaid first and second physical stops for physically holding the associated drivers against further movement when the corresponding shutter curtains reach open or closed positions in accordance with the direction of energization of respective drivers.

23 Claims, 6 Drawing Sheets

ROTATING MAGNET FOCAL PLANE SHUTTER USABLE IN A CAMERA AND HAVING AN IMPROVED DEVICE FOR HOLDING THE SHUTTER IN A CLOSED POSITION

TECHNICAL FIELD

This invention relates to the art of shutters, and more particularly to a new and improved electromagnetically driven focal plane shutter.

BACKGROUND OF THE INVENTION

A basic focal plane shutter comprises two sets or curtains of shutter blades each having a plurality of opaque thin plates pivotally connected to an arrangement of supporting arms. During a film exposing operation, one set of shutter blades is moved from an extended state to a contracted state, whereupon the other set of blades is moved from a contracted state to an extended state. An example of a basic focal plane shutter is disclosed in U.S. Pat. No. 4,024,555 issued May 17, 1977.

A typical mechanically operated focal plane shutter operates by releasing a spring associated with the film drive mechanism which opens the first shutter curtain. Then a second spring is released which closes the second shutter curtain. To re-cock the shutter, the foregoing sequence is not reversed exactly. The first shutter curtain is closed and then the second shutter curtain is opened. This prevents light from exposing the film while the shutter is being re-cocked.

Electromagnetically driven focal plane shutters for cameras have been proposed and patented. Advantages they can have over purely mechanically driven shutters include fewer parts, lower part cost and elimination of a mechanical interface to cock the camera shutter. Examples of electromagnetically driven focal plane shutters are disclosed in U.S. Pat. Nos. 4,338,013 and 4,339,190 issued Jul. 6, 1989 and Jul. 7, 1982, respectively.

OBJECTS AND SUMMARY OF THE INVENTION

It is a principal object of the present invention to provide an electromagnetically driven focal plane shutter which can be operated from either the start or hold positions to expose the photographic film thereby avoiding the need to cock the shutter curtains in preset locations and avoiding the need to return the curtains to the start position before the next exposure.

It is a further object of this invention to provide such an electromagnetically driven focal plane shutter which provides relatively greater holding force in the holding position yet requires relatively less energy to move the arrangement from the start position.

The present invention provides a shutter comprising a shutter curtain movably supported for opening and closing an exposure opening, electromagnetic driver means operatively coupled to the shutter curtain for moving the curtain between open and closed positions when the driver means is energized to cause movement in one direction, and first stop means associated with the electromagnetic driver means for physically holding the driver means against further movement in the one direction when the curtain reaches one of the open or closed positions. When the electromagnetic driver means is energized to cause movement in an opposite direction, a second stop means associated with the driver means and spaced from the first stop means physically holds the driver means against further movement in the opposite direction when the curtain reaches the other of the open or closed positions.

The electromagnetic driver means comprises an armature having opposite magnetic poles, a movable magnet operatively associated with the armature having opposite magnetic poles and having a home position where poles of the movable magnet are aligned with opposite poles of the armature and an intermediate position from which the magnet tends to move toward the home position, and means for energizing the armature to cause relative movement of the magnet in opposite directions. A mechanical coupling means is operatively connected to the movable magnet and to the shutter curtain for causing movement of the shutter curtain between open and closed positions in response to movement of the magnet. The first stop means co-operates with the mechanical coupling means for stopping movement of the magnet in one direction at a hold position prior to the home position so that the magnet and the shutter curtain remain stable at the hold position whereupon the shutter curtain is in one of the open or closed positions. The second stop means also co-operates with the mechanical coupling means for stopping movement of the magnet in an opposite direction at another hold position prior to the home position so that the magnet and the shutter curtain remain stable at the other hold position whereupon the shutter curtain is in the other of the open or closed positions.

In a focal plane shutter having first and second shutter curtains movably mounted in the camera for opening and closing the film exposure opening, there is provided first and second of the aforesaid electromagnetic driver means operatively coupled to the first and second curtains, respectively, for moving the curtains between open and closed positions when the respective driver means are energized, and each of the electromagnetic driver means is provided with the aforesaid first and second stop means for physically holding the associated driver means against further movement when the corresponding shutter curtains reach open or closed positions in accordance with the direction of energization of the respective driver means. As one of the shutter curtains is moved from a closed to an open position the other curtain is moved a predetermined time thereafter from an open to a closed position thereby defining a travelling slit shutter wherein the slit travels in one direction for one exposure and in the opposite direction for the next exposure, In addition, successive picture sequences advantageously are initiated from each of the hold positions, The foregoing and additional advantages and characterizing features of the present invention will become clearly apparent upon a reading of the ensuing detailed description wherein:

DETAILED DESCRIPTION

Figure 1:
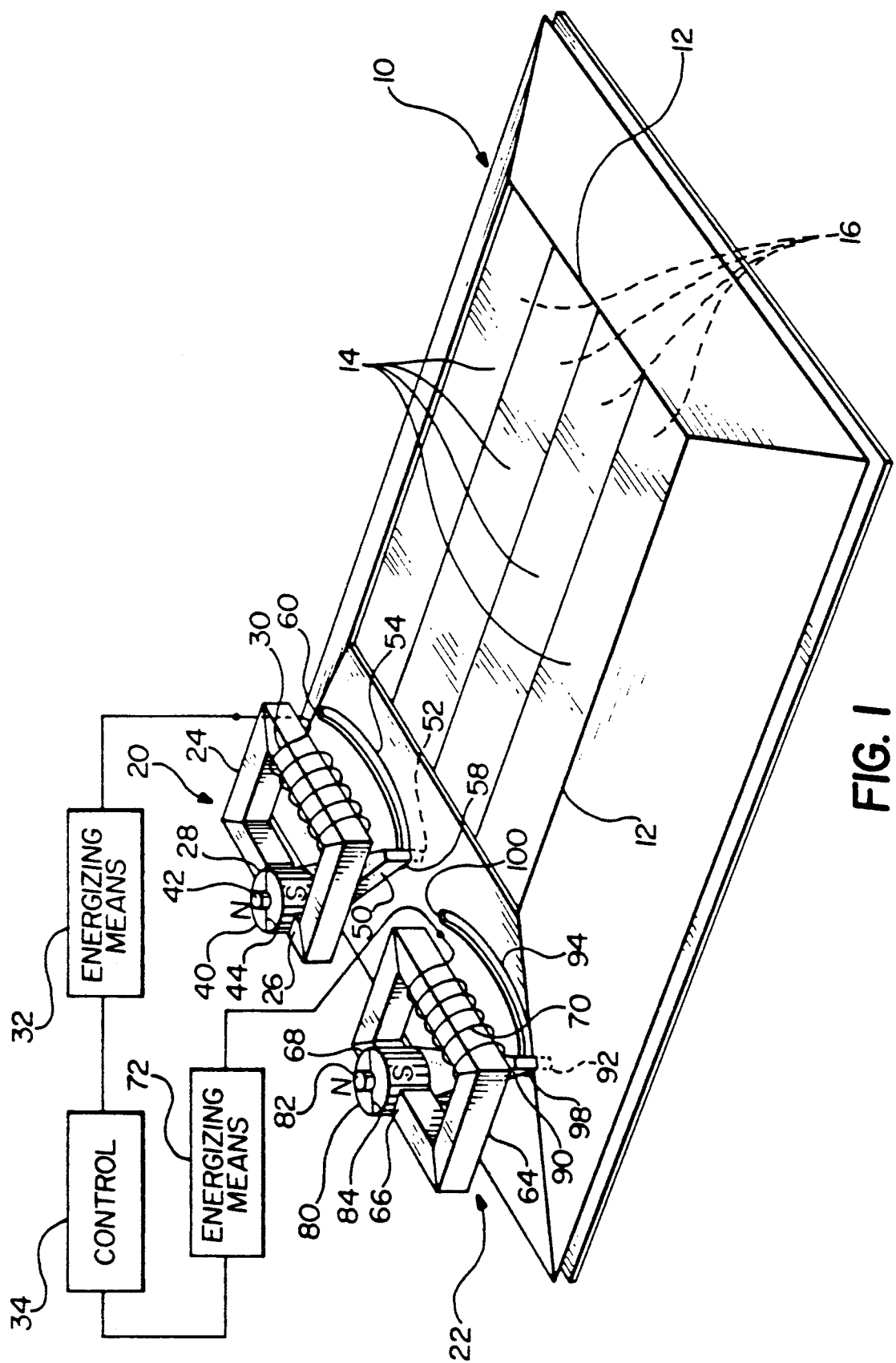
FIG. 1 in a diagrammatic perspective view of the electromagnetically driven focal plane shutter according to the present invention.

FIG. 1 shows a focal plane shutter operated by the electromagnetic driver according to the present invention. A shutter base plate assembly generally designated 10 has an exposure opening or aperture 12 and holds a first or leading curtain or group of shutter blades 14 and a second or trailing curtain or group shutter blades 16. The shutter blade assembly is well-known to those skilled in the art so that a detailed description thereof is believed to be unnecessary. Suffice it to say, each blade pivotally connected by a supporting arm or link to the base plate assembly 10. For a more detailed description of known shutter blade assemblies, reference may be made to the aforementioned U.S. Pat. No. 4,024,555 the disclosure of which is hereby incorporated by reference.

In accordance with the present invention, there is provided first and second electromagnetic driver means 20 and 22, respectively, operatively associated with the first and second shutter blade curtains 14 and 16, respectively. Referring first to driver means 20 it comprises electromagnetic means in the form of an armature 24 of ferromagnetic material having a pair of spaced apart pole faces 26, 28 and a coil 30 wound around the body thereof. As shown in FIG. 1, armature 24 is generally rectangular C-shaped but other shapes or configurations can be employed. Coil 30 is connected electrically to an energizing means or circuit 32 which, in turn, is connected to a control 34 for a purpose to be described. Armature 24 is supported by suitable means (not shown) in spaced relation to base plate assembly 10. Driver means 20 further comprises a rotatable magnet 40 operatively associated with armature 24 and having opposite magnetic poles. In particular, magnet 40 is of the permanent magnet type comprising a body of ferromagnetic material and is mounted by suitable means including post 42 for rotation in the gap between the pole faces 26,28 of armature 24. Magnet 40 preferably is disc-shaped including magnetic north and south pole portions separated by the line designated 44 in FIG. 1. Other shapes can of course be employed.

Driver means 20 further comprises means for mechanically coupling the rotatable magnet 40 to the first shutter blade curtain 14. In particular, an actuator arm 50 is fixed at one end to magnet 40 for movement therewith as it pivots about post 42. The other end of actuator arm 50 is connected to shutter blade curtain 14 in the following manner. A pin or extension 52 on the end of arm 50 extends through an opening in the form of an arcuate slot in base plate assembly 10 for connection to the support arms or links of the shutter blade curtain 14 in a suitable manner so that upon movement of pin 52 along slot 54 in response to rotation of magnet 40, curtain 14 is moved along the exposure opening 12.

In accordance with the present invention, there is provided stop means co-operating with the mechanical coupling means for controlling movement of the rotatable magnet 40 in a predetermined manner according to a magnetic relationship between the poles of magnet 40 and armature 24 which will be described in detail presently. In preferred form, a first stop means comprises one end or edge 58 of slot 54 which contacts or abuts pin 52 thereby defining one stop position for rotatable magnet 40. A second stop means comprises another or opposite end or edge 60 slot 54 which contacts or abuts pin 52 thereby defining another stop position for rotatable magnet 40.

In a similar manner, driver means 22 comprises electromagnetic means in the form of an armature 64 of ferromagnetic material having a pair of spaced apart pole faces 66, 68 and a coil 70 wound around the body thereof. Like armature 24, armature 64 is generally rectangular C-shaped but other shapes or configurations can be employed. Coil 70 is connected electrically to an energizing means or circuit 72 which, in turn, is connected to control 34. Armature 64 is supported by suitable means (not shown) in spaced relation to base plate assembly 10. Driver means 22 further comprises a rotatable magnet 80 operatively associated with armature 64 and having opposite magnetic poles. Like magnet 40, magnet 80 is of the permanent magnet type comprising a body of ferromagnetic material and is mounted by suitable means including post 82 for rotation in the gap between the pole faces 66, 68 of armature 64. Like magnet 40, magnet preferably is disc-shaped including magnetic north and south pole portions separated by the line designated 84 in FIG. 1. Other shapes can of course be employed.

Driver means 22 further comprises means for mechanically coupling the rotatable magnet 80 to the second shutter blade curtain 16. In particular, an actuator arm 90 is fixed at one end to magnet 80 for movement therewith as it pivots about post 82, and the other end of actuator arm 90 is connected to shutter blade curtain 16 in the following manner. A pin or extension 92 on the end of arm 90 extends through an opening in the form of an arcuate slot 94 in base plate assembly 20 for connection to the support arms or links of the shutter blade curtain 16 in a suitable manner so that upon movement of pin 92 along slot 94 in response to rotation of magnet 80, curtain 16 is moved along the exposure opening 12.

In accordance with the present invention, there is provided stop means co-operating with the mechanical coupling means for controlling movement of the rotatable magnet 80 in a predetermined manner according to a magnetic relationship between the poles of magnet 80 and armature 64 which will be described in detail presently. In preferred form, a first stop means comprises one end or edge 98 of slot 94 which contacts or abuts 92 thereby defining one stop position for rotatable magnet 80. A second stop means comprises another or opposite end or edge of slot 94 which contacts or abuts pin 92 thereby defining another stop position for rotatable magnet 80.

The electromagnetically driven focal plane shutter of the present invention operates in the following manner. The magnets 40, 80 are caused to rotate about their pivots when the associated armature 24, 64 is energized with voltage of the proper electrical polarity and strength. As the magnets 40 and rotate the shutter curtains 14 and 16, respectively, open or close depending upon their starting positions. The orientation of the magnets 40, 80 is such that when the corresponding shutter curtain 14, 16 is half closed, the imaginary line between the north and south pole of the magnet will be parallel and aligned with the centerline of the corresponding armature core 24, 64. In particular, each of the magnets 40, 80 seeks its home position, i.e. each magnet rotates toward the position where the line separating the north and south poles thereof is perpendicular to the centerline of the corresponding armature 24, 64. In this home position there is maximum magnetic attraction between the poles of the movable magnet 40, 80 and the ferromagnetic body 24, 64 associated with it. The imaginary line between the north and south poles of magnet 40 is designated 44 in FIG. 1, and the centerline of armature 24 extends between pole faces 26, 28 longitudinally along the section of armature 24 containing pole faces 26, 28. Similarly, the imaginary line between the north and south poles of magnet 80 is designated 84 in FIG. 1, and the centerline of armature 64 extends between pole faces 66, 68 longitudinally along the section of armature 64 containing pole faces 66, 68.

Further rotation of the magnets 40, 80 from the above-mentioned positions where lines 44, 84 are parallel to the centerlines of armatures 24, 64 will cause the magnets 40, 80 to continue rotation in that direction until a physical stop is reached or until the north and south poles of the magnets 40, 80 are aligned with the armature cores, i.e. until magnets 40, 80 reach their home positions. In accordance with the present invention, a physical stop will be reached before the poles of magnets 40, 80 are aligned with the armature cores, i.e. before magnets 40, 80 reach their home positions. Each magnet 40, 80 will remain in this position even when the corresponding armature 24, 64 is de-energized.

Thus, in contrast to purely mechanical arrangements, in the electromagnetically driven focal plane shutter of the present invention, the electromagnetic driver performs both functions of holding the shutter and moving it. Also, in purely mechanical arrangements, after a picture is taken, both shutter curtains must be returned back to the original position before the next picture is taken. In the electromagnetically driven shutter of the present invention, on the other hand, the shutter can be opened for picture taking during the return movement of the curtains as will be evident from the ensuing description. Furthermore, in purely mechanical arrngements the spring must be recoiled or reloaded before the next picture is taken, but this is completely avoided by the electromagnetically driven shutter of the present invention.

Figure 2:
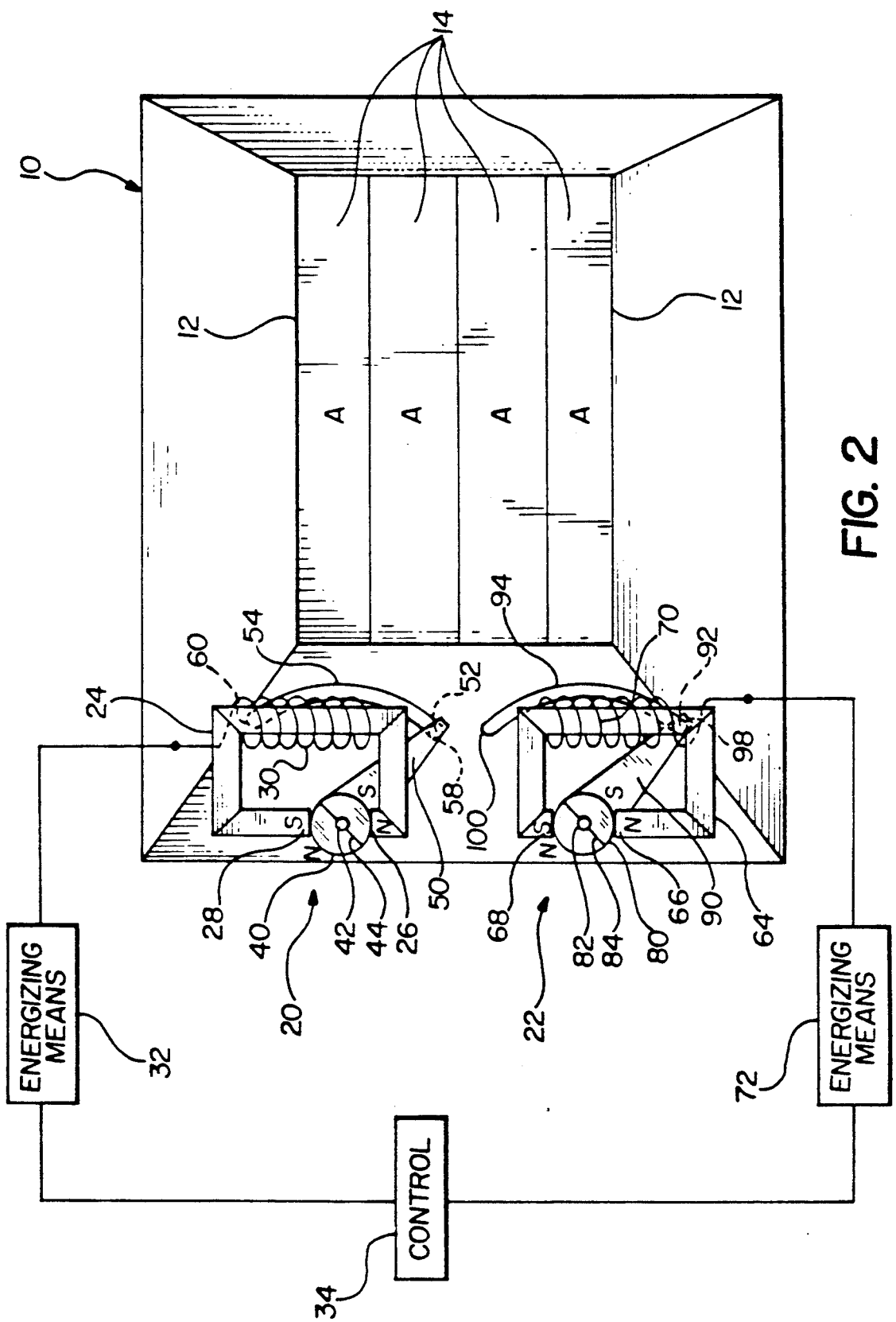
FIG. 2 is a diagrammatic plan view of the shutter of FIG. 1 at the beginning of a picture taking sequence.

Referring now to FIGS. 2-6, the elctromagnetically driven focal plane shutter of the present invention will be illustrated further by the following description of a picture-taking sequence. FIG. 2 illustrates the shutter arrangement in a stable, closed condition prior to a film exposing, picture-taking operation. Magnet 40 is in a rest position wherein it tends to rotate further clockwise toward its home position as viewed in FIG. 2 but is held in the rest position by engagement between pin 52 and stop 58. The shutter curtain 14 operated by magnet 40 is in a position covering exposure opening 12. Similarly, magnet is in a rest position wherein it tends to rotate further clockwise toward its home position as viewed in FIG. 2 but is held in the rest position by engagement between pin 92 and stop 98. The shutter curtain 16 operated by magnet 80 is in a position not covering opening 12.

Figure 3:
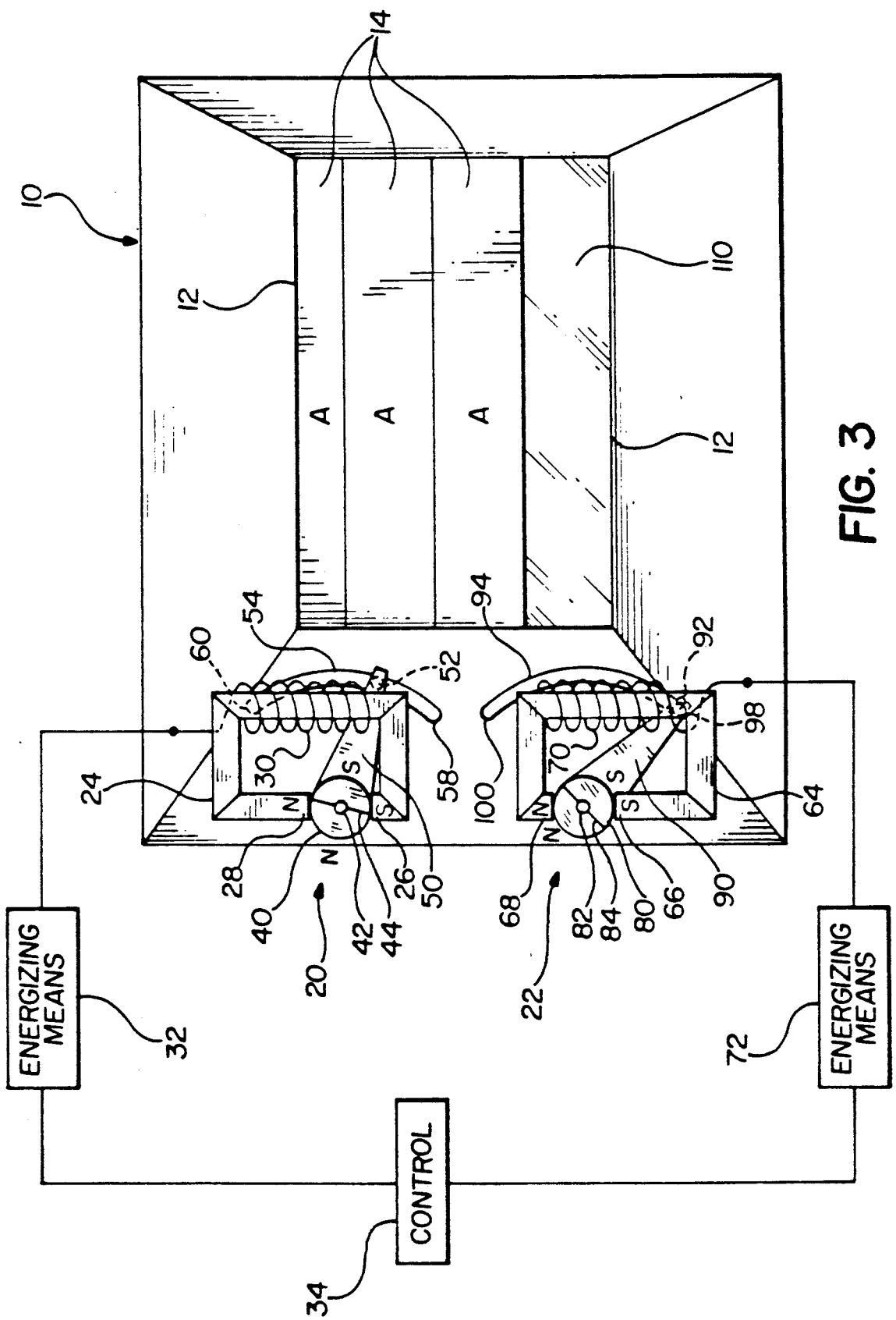
FIG. 3 is a view similar to FIG. 2 illustrating the shutter at a further stage in the picture taking sequence.

When the operator of the camera commands an exposure, control circuit 34 at a first instant in time causes circuit 32 to energize coil 30 of armature 24 in a forward direction. This reverses the magnetic polarities of armature pole faces 26, 28 from those shown in FIG. 2 to those shown in FIG. 3. At this instant, coil 70 is not energized. The forward energization of coil 30 causes magnet 40 to rotate in a counterclockwise direction as viewed in the drawing. FIG. 3 shows relative positions of shutter curtains 14, 15 and magnets 40, 80 after magnet 40 has rotated one-third of its total travel. Shutter curtain 14 has moved to open one-third of the area of the opening 12 in the form of a slit allowing light to expose a corresponding area of the film 110. Line 44 separating the north and south poles of magnet 40 has moved from the position of FIG. 2 to a position shown in FIG. 3 where it is almost parallel with the centerline of armature 24, i.e. the line extending between pole faces 26, 28 previously described. Further rotation of magnet 40 to a position where line 44 is parallel to the centerline of armature 24 will move shutter curtain 14 to a half-open position opening one-half the area of the opening 12 and exposing a corresponding area of film 110.

Figure 4:
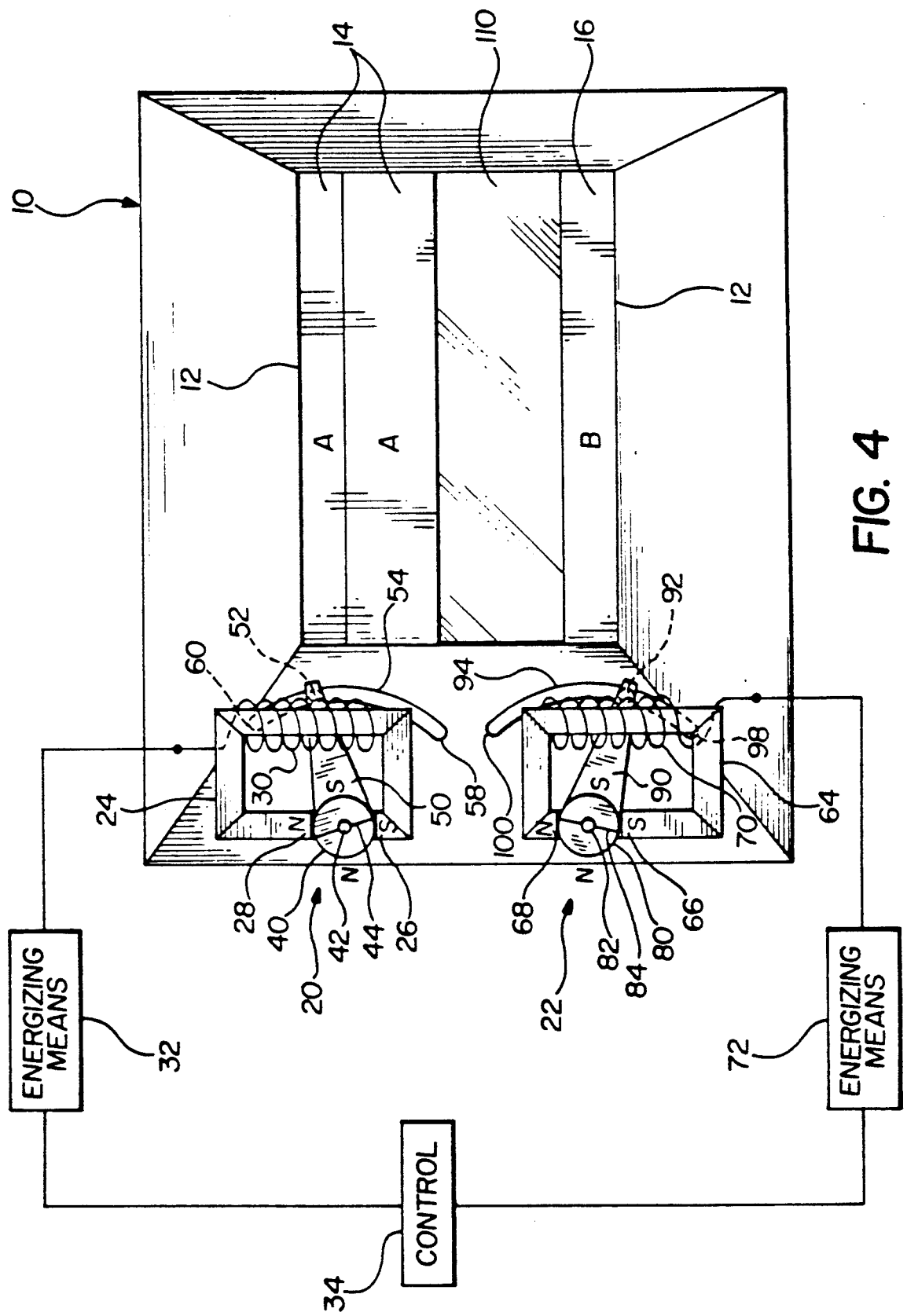
FIG. 4 is a view similar to FIG. 3 illustrating the shutter at a further stage in the picture taking sequence.

In the stage of operation illustrated in FIG. 3, magnet 80 is still in its rest position, whereupon at a second instant in time control circuit 34 causes circuit 72 to energize coil 70 armature 64 in a forward direction. This forward energization of coil 70 reverses the magnetic polarities of armature pole faces 66, 68 to those shown in FIG. 3 and causes magnet 80 to rotate a counterclockwise direction as viewed in the drawing. FIG. 4 shows the relative position of shutter curtains 14, 16 and magnets 40, 80 after magnet 40 has rotated two-thirds of its total travel. Shutter curtain 14 has moved to open two-thirds of the area of opening 12 and curtain 16 has moved to close one-third of the area of opening 12 thereby leaving one-third of opening 12 uncovered in the form of a slit. Thus, curtain 16 has moved to end exposure of the film 110 in the area covered thereby, and curtain 14 has moved to expose additional area of the film 110. During the foregoing movements of magnets 40, 80 and curtains 14, 16 both coils 30 and 70 are forward energized.

Figure 5:
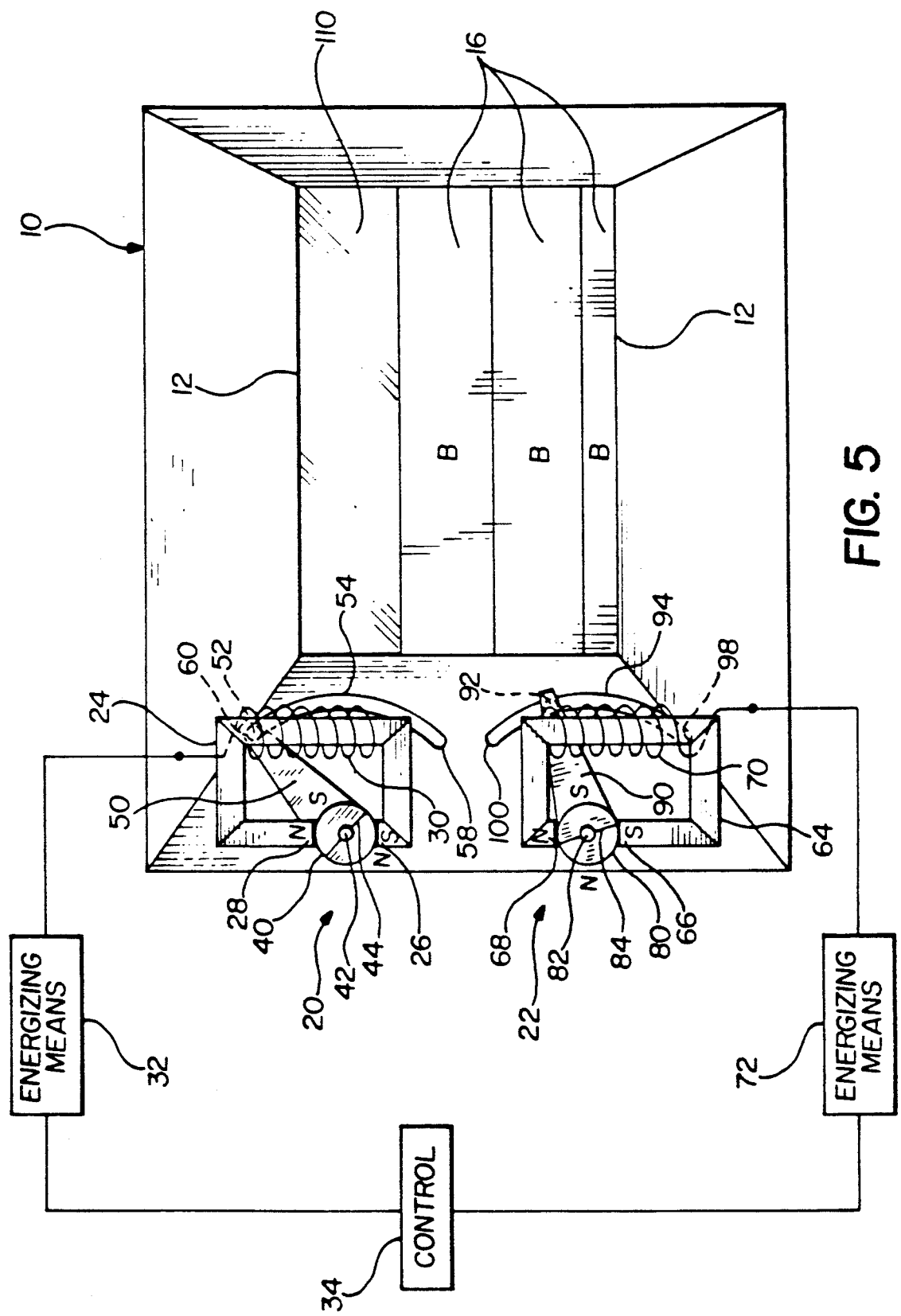
FIG. 5 is a view similar to FIG. 4 illustrating the shutter at a further stage in the picture taking sequence.

The forward energization of coils 30, 70 causes continued rotation of magnets 40, 80 each in a counterclockwise direction as viewed in the drawing. FIG. 5 shows the relative positions of shutter curtains 14, 16 and magnets 40, 80 after magnet 40 has rotated its full travel and magnet 80 has rotated two-thirds of its total travel. Shutter curtain 14 has moved to open the entire area of opening 12 and curtain 16 has moved to close two-thirds of the area of opening 12. Thus, curtain 16 has moved to end exposure of the film 110 in the area covered thereby, and curtain 14 has moved to expose the remaining area of film 110 in the form of a slit. Thus, dring the foregoing picture-taking sequence, the aforementioned slit travels in one direction along the opening 12.

The full travel of magnet 40 is determined by the location of the stop means in the form of end 60 of slot 54. In other words, engagement between pin 52 and end 60 prevents any further rotation of magnet 40 in the counterclockwise direction as viewed in the drawing. In accordance with the present invention, the stop means 60 is located so that rotation of magnet 40 is stopped or held at a location prior to the home position of magnet 40. As shown in FIG. 5, the home position of magnet 40 would be reached upon further counterclockwise rotation of magnet 40 until line 44 is perpendicular to the centerline of armature 24, i.e. the line extending between pole faces 26, 28. However, magnet 40 does not reach its home position due to the engagement between pin 52 and slot end 60. The tendency of magnet 40 to attempt to reach its home position, however, maintains magnet 40 in the hold position of FIG. 5 even after coil 30 is de-energized.

Figure 6:
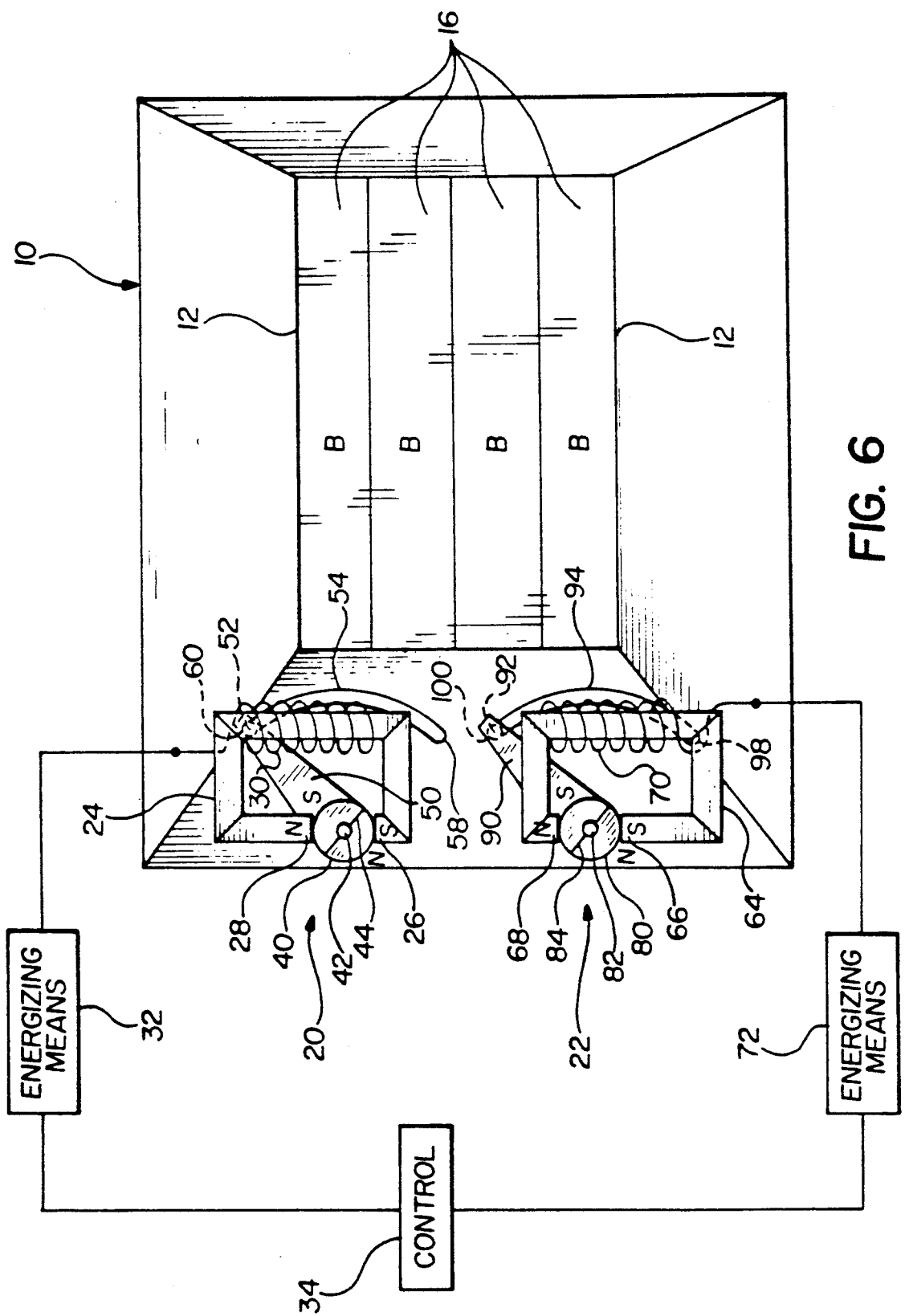
FIG. 6 is a view similar to FIG. 5 illustrating the shutter at the completion of the picture taking sequence.

When magnet 40 reaches the hold position of FIG. 5, this is indicated by appropriate sensing means (not shown) which signals control circuit 34 to cause circuit 32 to de-energize coil 30. Coil 70 remains forward energized causing further rotation of magnet 80 in a counterclockwise direction as viewed in the drawing. FIG. 6 shows the relative positions of shutter curtains 14, 16 and magnets 40, 80 after magnet 80 has rotated its full travel. Magnet 40 is stable and remains in its hold position previously reached as described in connection with FIG. 5. Likewise, shutter curtain 14 is stable and remains in its full-open position as described in connection with FIG. 5. The full travel of magnet 80 moves curtain 16 to close the entire area of opening 12 as shown in FIG. 6 thereby completely ending the exposure of film 110.

The full travel of magnet 80 is determined by the location of the stop means in the form of end 100 of slot 94. In other words, engagement between pin 92 and end 100 prevents any further rotation of magnet 80 in the counterclockwise direction as viewed in the drawing. In accordance with the present invention, the stop means 100 is located so that rotation of magnet 80 is stopped or held at a location prior to the home position of magnet 80. As shown in FIG. 6, the home position of magnet 80 would be reached upon further counterclockwise rotation of magnet 80 until line 84 is perpendicular to the centerline of armature 64, i.e. the line extending between pole faces 66, 68. However, magnet 80 does not reach its home position due to the engagement between pin 92 and slot end 100. The tendency of magnet 80 to attempt to reach its home position, however, maintains magnet 80 in the hold position of FIG. 6 even after coil 70 is de-energized.

When magnet 80 reaches the hold position of FIG. 6, this is indicated by appropriate sensing means (not shown) which signals control circuit 34 to cause circuit 72 to de-energize coil 70. Magnet 80 is stable and remains in the hold position and, similarly, shutter curtain 16 is stable and remains in its full-closed position. Thus, the operation for the taking of a single picture or exposure is completed. The time delay between the instant at which coil 30 is energized and the subsequent time at which coil 70 is energized during the foregoing operation determines the shutter speed of the system. Magnets 40, 80 and shutter curtains 14, 16 remain stable in the hold positions illustrated in FIG. 6 and are ready for the next picture taking sequence.

The next picture taking sequence is similar to but the reverse of the sequence described in connection with FIGS. 2–6. Advantageously, it begins from the hold positions of the components as shown in FIG. 6 without the need to return magnets 40, 80 and curtains 14, 16 to the hold positions of FIG. 2. Coil 70 is energized first and in a reverse direction under control of circuit 34 causing clockwise rotation of magnet 80 to open shutter curtain 16 thereby exposing the next region or portion of film 110 which has been advanced by appropriate means (not shown). After the aforementioned time delay coil 30 is energized under control of circuit 34 and in a reverse direction causing clockwise rotation of magnet 40 to close shutter curtain behind the progressively opening curtain 16. This defines a slit in a manner similar to the preceding sequence, which slit travels along opening 12 in the opposite direction. Magnet 80 reaches the hold position first, being provided by engagement between pin 92 and slot end 98, whereupon coil 70 is de-energized and magnet and curtain 16 remain stable in the hold position. After the aforementioned time delay, magnet 40 reaches the hold position, being provided by engagement between pin 52 and slot end 58, whereupon coil 30 is de-energized and magnet 40 and curtain 14 remain stable in the hold position. Accordingly, this picture taking operation is completed, opening 12 is completely covered by curtain 14 and magnets 40, 80 and curtains 14,16 remain stable in the hold positions and are ready for the next picture taking sequence.

The arrangement of the present invention thus has two hold positions, one defined by engagement of pins 52 and 92 with slot ends 58 and 98, respectively, as illustrated in FIG. 2 and the other defined by engagement of pins 52 and 92 with slot ends 60 and 100 as illustrated in FIG. 6. One important advantage of the arrangement of the present invention is that successive picture taking sequences are initiated from each of the hold positions. In other words, in connection with the sequence illustrated in FIGS. 2–6, once the hold position of FIG. 6 was reached, the next picture taking sequence was initiated from that hold position. It was not necessary to return magnets 40, 80 and curtains 14, 16 to the hold position of FIG. 2 in order to begin the next picture taking sequence.

As previously described, in the arrangement of the present invention a physical stop is reached before the magnetic poles of the rotating magnet are aligned with the armature or coil. This advantageously provides greater holding force in the holding position yet requires relatively less energy to move the arrangement from a starting position. Furthermore, the magnet advantageously will remain in the hold position even when the armature is de-energized. The foregoing also significantly minimizes the possibility of inadvertent exposure of the film due to a physical shock to the camera.

It is therefore apparent that the present invention accomplishes its intended objects. While an embodiment of the present invention has been described in detail, that is for the purpose of illustration, not limitation.

I claim:

1. A focal plane shutter comprising:
   a) first and second shutter curtains movably supported for opening and closing an exposure opening;
   b) first electromagnetic driver means operatively coupled to said first shutter curtain for moving said first curtain between open and closed positions when said first electromagnetic driver means is energized to cause movement in one direction, said first electromagnetic driver means having a home operating position and an intermediate operating position from which said first electromagnetic driver means tends to move toward said home position;
   c) stop means positionally and operatively associated with said first electromagnetic driver means for physically holding said first electromagnetic driver means against further movement in said one direction when said first shutter curtain reaches an open or closed position, said stop means being located so as to stop movement of said first electromagnetic driver means at a hold position prior to said home operating position so that said first electromagnetic driver means and said first shutter curtain remain at said hold position whereupon said first shutter curtain is in one of the open or closed positions;

d) second electromagnetic driver means operatively coupled to said second shutter curtain for moving said second curtain between open and closed positions when said second electromagnetic driver means is energized to cause movement in one direction, said second electromagnetic driver means having a home operating position and an intermediate operating position from which said second electromagnetic driver means tends to move toward said home position;

e) stop means positionally and operatively associated with said second electromagnetic driver means for physically holding said second electromagnetic driver means against further movement in said one direction when said second shutter curtain reaches an open or closed position, said stop means being located so as to stop movement of said second electromagnetic driver means at a hold position prior to said home operating position so that said second electromagnetic driver means and said second shutter curtain remain at said hold position whereupon said second shutter curtain is in one of the open or closed positions.

2. A focal plane shutter according to claim 1, further including:
a) another stop means associated with said first electromagnetic driver means for physically holding said first electromagnetic driver means against further movement in an opposite direction when said first shutter curtain reaches an open or closed position; and
b) another stop means associated with said second electromagnetic driver means for physically holding said driver means against further movement in an opposite direction when said second shutter curtain reaches an open or closed position.

3. A focal plane shutter according to claim 1, further including means for movably mounting said shutter curtains in a camera having film operatively associated with the exposure opening.

4. A focal plane shutter comprising:
a) first and second shutter curtains movably supported for opening and closing an exposure opening;
b) first electromagnetic driver means operatively coupled to said first shutter curtain for moving said first curtain between open and closed positions when said first electromagnetic driver means is energized to cause movement in one direction, said first electromagnetic driver means comprising an armature having opposite magnetic poles, a movable magnet operatively associated with said armature having opposite magnetic poles and having a home position where poles of said movable magnet are aligned with opposite poles of said armature and an intermediate position from which said magnetic tends to move toward said home position, and means for energizing said armature to cause selective movement of said magnet in opposite directions;
c) stop means associated with said first electromagnetic driver means against further movement in said one direction when said first shutter curtain reaches an open or closed position, said stop means being located so as to stop movement of said magnet at a hold position prior to said home position so that said magnet and said first shutter curtain remain at said hold position whereupon said first shutter curtain is in one of the open or closed positions;

d) second electromagnetic driver means operatively coupled to said second shutter curtain for moving said second shutter curtain between open and closed positions when said second electromagnetic driver means is energized to cause movement in one direction; and e) stop means associated with said second electromagnetic driver means for physically holding said second electromagnetic driver means against further movement in said one direction when said second shutter curtain reaches an open or closed position.

5. A focal plane shutter according to claim 4, further including another stop means associated with said first electromagnetic driver means for physically holding said first electromagnetic driver means against further movement in an opposite direction when said first shutter curtain reaches an open or closed position, said another stop means being located so as to stop movement of said magnet at a hold position prior to said home position so that said magnet and said first shutter curtain remain at said hold position whereupon said first shutter curtain is in the other of the open or closed positions.

6. A focal plane shutter comprising:
a) first and second shutter curtains movably supported for opening and closing an exposure opening;
b) first electromagnetic driver means operatively coupled to said first shutter curtain for moving said first shutter curtain between open and closed positions when said first electromagnetic driver means is energized to cause movement in one direction;
c) stop means associated with said first electromagnetic driver means for physically holding said first electromagnetic driver means against further movement in said one direction when said first shutter curtain reaches an open or closed position;
d) second electromagnetic driver means operatively coupled to said second shutter curtain for moving said second shutter curtain between open and closed positions when said second electromagnetic driver means is energized to cause movement in one direction, said second electromagnetic driver means comprising an armature having opposite magnetic poles, a movable magnet operatively associated with said armature having opposite magnetic poles and having a home position where poles of said movable magnet are aligned with opposite poles of said armature and an intermediate position from which said magnet tends to move toward said home position, and means for energizing said armature to cause selective movement of said magnet in opposite directions; and
e) stop means associated with said second electromagnetic driver means for physically holding said second electromagnetic driver means against further movement in said one direction when said second shutter curtain reaches an open or closed position, said stop means being located so as to stop movement of said magnet at a hold position prior to said home position so that said magnet and said second shutter curtain is in one of the open or closed positions;

7. A focal plane shutter according to claim 6, further including another stop means associated with said second electromagnetic driver means for physically holding said second electromagnetic driver means against further movement in an opposite direction when said second shutter curtain reaches an open or closed position, said another stop means being located so as to stop movement of said magnet at a hold position prior to said home position so that said magnet and said second shutter curtain remain at said hold position whereupon said second shutter curtain is in the other of the open or closed positions.

8. A focal plane shutter comprising:
 a) first and second shutter curtains movably supported for opening and closing an exposure opening;
 b) first electromagnetic driver means comprising an armature having opposite magnetic poles, a movable magnet operatively associated with said armature having opposite magnetic poles and having a home position where poles of said movable magnet are aligned with opposite poles of said armature and an intermediate position from which said magnet tends to move toward said home position, and means for energizing said armature to cause selective movement of said magnet in opposite directions;
 c) first mechanical coupling means operatively connected to said movable magnet and to said first shutter curtain for causing movement of said shutter curtain between open and closed positions in response to movement of said magnet;
 d) first stop means co-operating with said first mechanical coupling means for stopping movement of said magnet in one direction at a hold position prior to said home position so that said magnet and said first shutter curtain remain at said hold position whereupon said first shutter curtain is in one of the open or closed positions;
 e) second stop means spaced from said first stop means and co-operating with said mechanical coupling means for stopping movement of said magnet in an opposite direction at another hold position prior to said home position so that said magnet and said first shutter curtain remain at said another hold position whereupon said first shutter curtain is in the other of the open or closed positions;
 f) second electromagnetic driver means comprising an armature having opposite magnetic poles, a movable magnet operatively associated with said armature having opposite magnetic poles and having a home position where poles of said movable magnet are aligned with opposite poles of said armature and an intermediate position from which said magnet tends to move toward said home position, and means for energizing said armature to cause selective movement of said magnet in opposite directions;
 g) second mechanical coupling means operatively connected to said movable magnet and to said second shutter curtain for causing movement of said shutter curtain between open and closed positions in response to movement of said magnet;
 h) third stop means co-operating with said second mechanical coupling means for stopping movement of said magnet in one direction at a hold position prior to said home position so that said magnet and said second shutter curtain remain at said hold position whereupon said second shutter curtain is in one of the open or closed positions; and
 i) fourth stop means spaced from said third stop means and co-operating with said second mechanical coupling means for stopping movement of said magnet in an opposite direction at another hold position prior to said home position so that said magnet and said second shutter curtain remain at another hold position whereupon said second shutter curtain is in the other of the open or closed positions.

9. A focal plane shutter according to claim 8, wherein said first and second stop means comprise spaced apart ends of a slot provided in a body associated with a opening through which slot said first mechanical coupling means extends.

10. A focal plane shutter according to claim 8, wherein said third and fourth stop means comprise spaced apart ends of a slot provided in a body associated with an opening through which slot said second mechanical coupling means extends.

11. A focal plane shutter according to claim 9, wherein said magnet is mounted for rotation relative to said armature and wherein said slot is arcuate.

12. A focal plane shutter according to claim 10, wherein said magnet is mounted for rotation relative to said armature and wherein said slot is arcuate.

13. A focal plane shutter according to claim 8, further including means for movably mounting said shutter curtains in a camera having film operatively associated with the exposure opening.

14. A shutter comprising:
 a) a shutter curtain movably supported for opening and closing an exposure opening;
 b) electromagnetic driver means comprising an armature having opposite magnetic poles, a movable magnet operatively associated with said armature having opposite magnetic poles and having a home position where poles of said movable magnet are aligned with opposite poles of said armature and an intermediate position from which said magnet tends to move toward said home position, and means for energizing said armature to cause selective movement of said magnet in opposite directions;
 c) mechanical coupling means operatively connected to said movable magnet and said shutter curtain for causing movement of said shutter curtain between open and closed positions in response to movement of said magnet; and
 d) first stop means co-operating with said mechanical coupling means for stopping movement of said magnet in one direction at a hold position prior to said home position so that said magnet and said shutter curtain remain at said hold position whereupon said shutter curtain is in one of the open or closed positions.

15. A shutter according to claim 14, further including second stop means spaced from said first stop means and co-operating with said mechanical coupling means for stopping movement of said magnet in an opposite direction at another hold position so that said magnet and said shutter remain of said another hold position whereupon said shutter curtain is in the other of the open or closed positions.

16. A shutter according to claim 14, wherein said first stop means comprises an end of a slot provided in a body associated with an opening through which slot said mechanical coupling means extends.

17. A shutter according to claim 15, wherein said second stop means comprises an end of a slot provided in a body associated with an opening through which slot said mechanical coupling means extends.

18. A shutter according to claim 15, wherein said first and second stop means comprise spaced apart ends of a slot provided in a body associated with an opening through which slot said mechanical coupling means extends.

19. A focal plane shutter according to claim 16, wherein said magnet is mounted for rotation relative to said armature and wherein said slot is arcuate.

20. A focal plane shutter according to claim 17, wherein said magnet is mounted for rotation relative to said armature and wherein said slot is arcuate.

21. A focal plane shutter according to claim 18, wherein said magnet is mounted for rotation relative to said armature and wherein said slot is arcuate.

22. A method of operating a focal plane shutter comprising first and second shutter curtains for opening and closing an exposure opening, and first and second electromagnetic drive means operatively coupled to said first and second curtains, respectively, for moving said curtains between open and closed positions, said method comprising the steps of:
   a) energizing said first driver means in one direction in a manner such that said first driver means tends to move from an intermediate operating position toward a home position to cause movement of said first shutter curtain from a position closing said exposure opening to a position opening said exposure opening;
   b) energizing said second driver means in one direction a predetermined time thereafter in a manner such that said second driver means tends to move from an intermediate operating position toward a home operating position to cause movement of said second shutter curtain from a position opening said exposure opening to a position closing said exposure opening;
   c) physically holding said first driver means against further movement when said open position of said first shutter curtain is reached and at a hold position of said first driver means prior to said home operating position so that said first driver means and said first shutter curtain remain at said hold position; and
   d) physically holding said second driver means against further movement when said closed position of said second shutter curtain is reached and at a hold position of said second driver means prior to said home operating position so that said second driver means and said second shutter curtain remain at said hold position;
   e) whereby a single exposure is made through said opening.

23. A method according to claim 22, further comprising the steps of:
   a) energizing said second driver means in an opposite direction in a manner such that said second driver means tends to move from an intermediate operating position toward a home position to cause movement of said second shutter curtain from a position closing said exposure opening to a position opening said exposure opening;
   b) energizing said first driver means in an opposite direction a predetermined time thereafter in a manner such that said first driver means tends to move from an intermediate operating position toward a home operating position to cause movement of said first shutter curtain from a position opening said exposure opening to a position closing said exposure opening;
   c) physically holding said second driver means against further movement when said open position of said second shutter curtain is reached and at a hold position of said second driver means prior to said home operating position so that said second driver means and said second shutter curtain remain at said hold position; and
   d) physically holding said first driver means against further movement when said closed position of said first shutter curtain is reached and at a hold position of said first driver means prior to said home operating position so that said first driver means and said first shutter curtain remain at said hold position;
   e) whereby a next successive exposure is made through said opening.

* * * * *

UNITED STATES PATENT AND TRADEMARK OFFICE
CERTIFICATE OF CORRECTION

PATENT NO. : 5,333,025
DATED : July 26, 1994
INVENTOR(S) : David R. Dowe

It is certified that error appears in the above-identified patent and that said Letters Patent is hereby corrected as shown below:

Column 9, claim 2, line 36 after "said" insert --second electormagnetic--.

Column 9, claim 4, line 58-59 delete "magnetic" and insert --magnet--.

Column 9, claim 4, line 64 after "means" insert --for physically holding said first electromagnetic driver means--.

Signed and Sealed this

Twenty-second Day of November, 1994

Attest:

BRUCE LEHMAN

Attesting Officer     Commissioner of Patents and Trademarks